(12) United States Patent
Jensen et al.

(10) Patent No.: US 6,340,383 B1
(45) Date of Patent: Jan. 22, 2002

(54) FILTER HAVING A CLEANING NOZZLE

(75) Inventors: Arne Grønbæk Jensen, St. Fuglede; Keld Christensen, Ruds Vedby, both of (DK)

(73) Assignee: Simatek A/S, Herslev S (DK)

( * ) Notice: Subject to any disclaimer, the term of this patent is extended or adjusted under 35 U.S.C. 154(b) by 0 days.

(21) Appl. No.: 09/530,753

(22) PCT Filed: Nov. 10, 1998

(86) PCT No.: PCT/DK98/00483

§ 371 Date: May 4, 2000

§ 102(e) Date: May 4, 2000

(87) PCT Pub. No.: WO99/24146

PCT Pub. Date: May 20, 1999

(30) Foreign Application Priority Data

Nov. 10, 1997 (DK) .................................................. 97/423

(51) Int. Cl.[7] .................................................. B01D 46/04
(52) U.S. Cl. .......................................... 96/233; 95/281
(58) Field of Search .......................... 96/233; 55/341.1; 95/281

(56) References Cited

U.S. PATENT DOCUMENTS 5,766,281 A * 6/1998 Luy et al.

FOREIGN PATENT DOCUMENTS

| EP | 0719577 | 11/1995 |
|---|---|---|
| EP | 781587 | * 7/1997 |

* cited by examiner

*Primary Examiner*—Thomas M. Lithgow
(74) *Attorney, Agent, or Firm*—Dykema Gossett PLLC

(57) ABSTRACT

A filter for filtering a particle-containing medium and having nozzles includes a housing having an inlet opening and an outlet opening for the cleaning fluid, the openings forming between them a passage defined by a wall, a valve body having a valve head and a valve rod, the valve rod being arranged to be moved in the interior of the passage between a first end position and a second end position to control the flow of the cleaning fluid toward the partition plate and/or the filter devices, the outlet opening forming a valve seat adapted to cooperate with the valve head in the first position to prevent outflow of the cleaning fluid, and a spring for generating a bias of the valve body in a direction toward the first end position. The valve body also includes a piston device acting as a hydraulic piston and arranged between the inlet opening and the outlet opening and adapted to generate a pressure loss in the cleaning fluid during its flow from the inlet opening and through the passage, whereby the valve body is moved in a direction toward the second end position to allow outflow of the cleaning fluid through the outlet opening.

15 Claims, 4 Drawing Sheets

FILTER HAVING A CLEANING NOZZLE

BACKGROUND OF THE INVENTION

1. Field of the Invention

The present invention relates to a filter for filtering a particle-containing medium and of the type including a chamber having a first section and a second section, a substantially horizontally extending partition plate which separates the two sections, the partition plate carrying a plurality of filter devices through which the medium to be filtered passes from the first section to the second section, and a plurality of nozzles connected with a source of pressurized cleaning fluid and adapted to generate a flow of cleaning fluid directed toward the partition plate and/or the filter devices. The nozzles include a housing having a inlet opening and an outlet opening for the cleaning fluid, the openings formal between them a passage defined by a wall, a valve body having a valve head and a valve rod, the valve rod being arranged to be moved in the interior of the passage between a first end position to control the flow of the cleaning fluid toward the partition plate and/or the filter devices, the outlet opening forming a valve seat adapted to cooperate with the valve head in the first position to prevent outflow of the cleaning fluid, a means for generating a bias of the valve body in a direction toward the first position.

2. The Prior Art

Filters having such cleaning nozzles, by means of which cleaning of the filter devices may be performed, have acquired great interest among the users, because when ejecting a cleaning medium for the cleaning nozzles it is possible to perform regular cleaning of the filter devices, which may, e.g., be formed by vertically suspended bag filters, on site, i.e., without it being necessary to remove the filter devices from the filter chamber itself. According to the conventional use of such filters, one or more vertically hanging bag filters are secured to the partition plate, and the first section in the chamber forms a lower dust-laden area, while the second section forms an upper clean air area. Filtering takes place in that the particle-containing medium, which may typically be air, is passed into the first section of the chamber, through the filtering wall of the bag filters, and further up through a hole in the partition plate and into the second section. The cleaning nozzle, which is mounted in the partition plate, and which is adapted to generate a flow of cleaning fluid toward the bag filters, is provided with a cleaning fluid under pressure via a supply line. An example of this is described in European Patent Application No. 719 577, where the nozzles comprise a movable valve body having a valve head and a valve rod. The rod is kept closed by means of a spring which tries to keep the valve head engaged with a valve seat. The nozzle opens when the pressure of the cleaning fluid directly against the upper side of the valve head exceeds the oppositely directed force of the spring, thereby allowing the cleaning fluid to flow out in a direction perpendicular to the longitudinal axis of the valve rod, after the flow has been deflected by the upper side of the valve head. Because of this structure, variations in the pressure of the cleaning fluid will only give rise to relatively modest changes in the position of the valve head. During the cleaning process, the cleaning fluid can moreover only be ejected substantially horizontally along the underside of the partition plate and toward the adjoining bag filter, following which the cleaning fluid runs down the bag filter by gravity. Thus, there is no flushing proper of a large area of the upper part of the bag filter in which large amounts of particles often settle, and the cleaning therefore does not have an optimum efficiency.

The principle of the nozzle known from the above-mentioned European patent application is shown more fully in FIG. 1 of the present application. In practice, it has been found inexpedient with this known nozzle that only a very small gap is formed between the valve head and the valve seat in use, as small particles contained in the cleaning fluid can settle on the valve head, as indicated by reference numeral 100. Such small particles have the effect that the nozzle cannot close tightly when the flow of the cleaning fluid stops, and the cleaning nozzle must therefore be removed from the filter at regular intervals to be cleaned. This leakage means in certain circumstances that, in the normal operation of the filter, the particle-containing medium to be filtered flows into and possibly settle inside the nozzle, which must be avoided particularly when the specifications of use of the filter demand that no hotbed of bacterial growth must be present anywhere in the filter, as is the case in, e.g., sanitary systems or in the food industry.

SUMMARY OF THE INVENTION

The present invention is intended to remedy to the above-mentioned inexpediencies by providing a filter by means of which a completely tight engagement of the valve head with the valve seat in the closed state of the nozzle can be achieved to a greater degree than before, and by means of which it can be possible also to obtain a more effective cleaning of the filter devices, if desired. This is achieved according to the invention in that the valve body also includes a piston device acting as a hydraulic piston, the piston device being arranged between the inlet opening and the outlet opening and adapted to generate a pressure loss in the cleaning fluid during its flow from the inlet opening and trough the passage, whereby the valve body is moved in a direction toward the second position of the cleaning liquid through the outlet opening.

The pressure of the cleaning fluid is hereby used to open the valve body, the pressure being applied to the piston device to act in a direction against the spring force. The nozzle is hereby more sensitive to variations in the pressure of the cleaning fluid, which is utilized according to the invention to allow setting of the valve body in various cleaning positions, according to which part of the bag filter is to be cleaned. Moreover, it is hereby possible to generate a very large opening of the nozzle, as needed, so that particles, if any, of the size conventionally found in the cleaning fluid, also as a consequence of recirculation of the cleaning fluid, can escape through the gap between the valve seat and the valve head.

In expedient embodiments, the piston device may be constructed as a cylindrical body having plurality of small channels therethrough so that the cleaning fluid is driven through the plurality of small channels, which give rise to a relatively great pressure drop. As mentioned, this pressure drop creates a force on the piston rod which tries to move the piston rod in a direction against the spring force and thus causes opening of the nozzle. With particular constructional advantages, the channels may be constructed as depressions in the peripheral face of the cylindrical body, and the channels may preferably be constructed helical depressions so that the cleaning fluid is given a helical motion which may be utilized for creating an expedient ejection pattern. When also providing the passage with a constriction in combination with helical channels, a good distribution of the cleaning fluid is achieved. Particularly advantageously, the nozzles of the filter may be constructed so that in various positions between the first and second end positions the valve body may generate pre-defined outflow patterns for the cleaning fluid. Particularly, it will hereby be possible selectively to perform cleaning of the partition plate or of the bag filter. This may preferably take place in that the surface of the valve head facing the outlet opening has a conically tapering part with a cone angle v1, which is preferably very small, whereby the cleaning fluid, is a given position of the valve body, will be reflected upwards and hit the partition plate.

BRIEF DESCRIPTION OF THE DRAWINGS

The invention will be explained more fully below with reference to an example shown in the drawings. Brief Description of the Drawings

DETAILED DESCRIPTION OF THE PREFERRED EMBODIMENT

Figure 1:
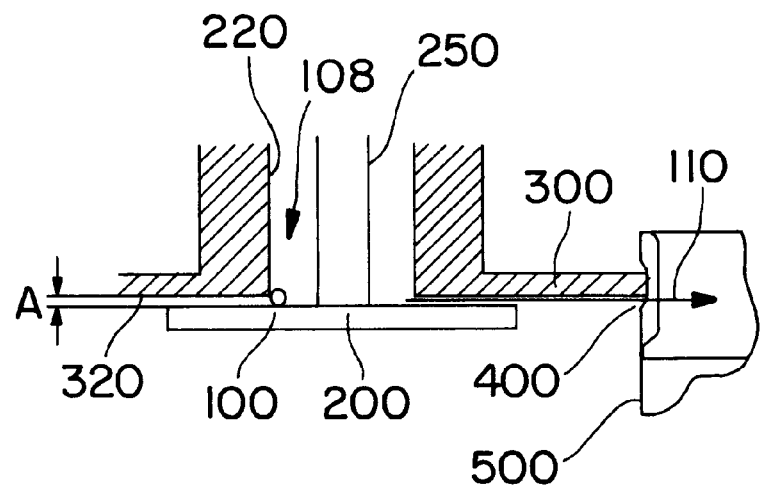
FIG. 1 shows the nozzle in European Patent Application No. 719 577 on an enlarged scale.

FIG. 1 shows the valve head with the reference numeral 200 in the nozzle from the European Patent Application No. 719 577, received in a partition plate 300 between the upper and lower chamber sections. A conventional bag filter is shown with the reference numeral 500, and the reference numeral 400 indicates the upper edge of the bag filter. The valve head 200 is connected with a valve rod 250 which is controlled in a cylindrical passage 108 defined by an annular wall 220. The arrow 110 indicates the preferably horizontal flow of the cleaning fluid which flows out through the passage 108, and which hits the upper edge 400 of the bag filter 500. The reference numeral 100 indicates a particle contained in the cleaning fluid and deposited in the gap between the surface of the valve head 200 facing the passage 108, and an area 320 of the partition plate 300 which forms a valve seat for the valve head 200. As shown, the particle 100 means that the valve head cannot tightly engage the valve seat 320 in the closed position, there being formed a small intermediate gap with the dimension A.

Figure 2:
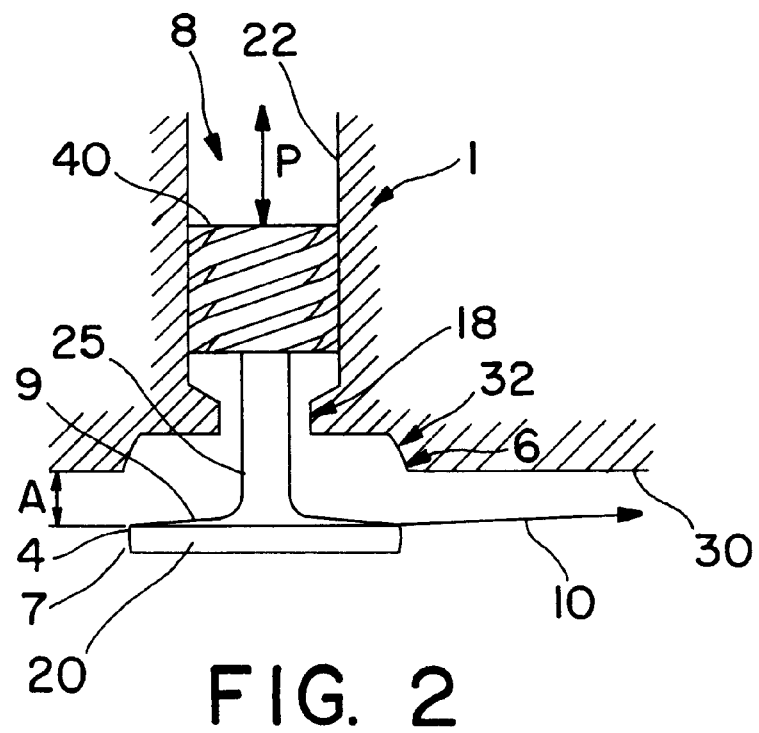
FIG. 2 shows a cleaning nozzle according to the invention incorporated in the partition plate between the upper section and lower section of the filter chamber.

In FIG. 2, the cleaning nozzle 1 of the filter according to the present invention is shown in a position in which the surface 9 of the valve head 20 facing the valve seat 32 is present at a certain distance from the valve seat 32. The nozzle 1 is incorporated in a filter having two sections, which are separated from each other by a partition plate 30. The nozzle 1 is connected with a source (not shown) of a cleaning fluid, which is preferably a liquid, and which may be fed to the nozzle 1 under pressure. More particularly, as will be seen, the nozzle 1 comprises a nozzle housing having an upper inlet opening and a lower outlet opening of the cleaning fluid, and these openings for between them an cylindrical passage 8 which is defined by a wall 22 in the nozzle housing. A valve body is mounted in the passage 8, the valve body consisting of the valve head 20 connected with a valve rod 25 and a piston device 40. The valve body can reciprocate as an assembled unit in the passage 8 along the arrow P between two end positions, with the piston device 40 in tight engagement with the wall 22 of the passage 8. A spring (not shown) serves to generate a bias of the valve body in an upward direction, i.e., urging the upper surface of the valve head 20 to engage the valve seat 32.

The piston device 40 includes a plurality of through channels through which the cleaning fluid can flow during its flow from the inlet opening to the outlet opening. The passage 8 also includes a constricted portion 18 which, if desired, can form a stop for the piston device 40 in an end position, but which preferably serves to impart a rotary movement to the cleaning fluid prior to its discharge from the outlet opening.

Figure 3A:
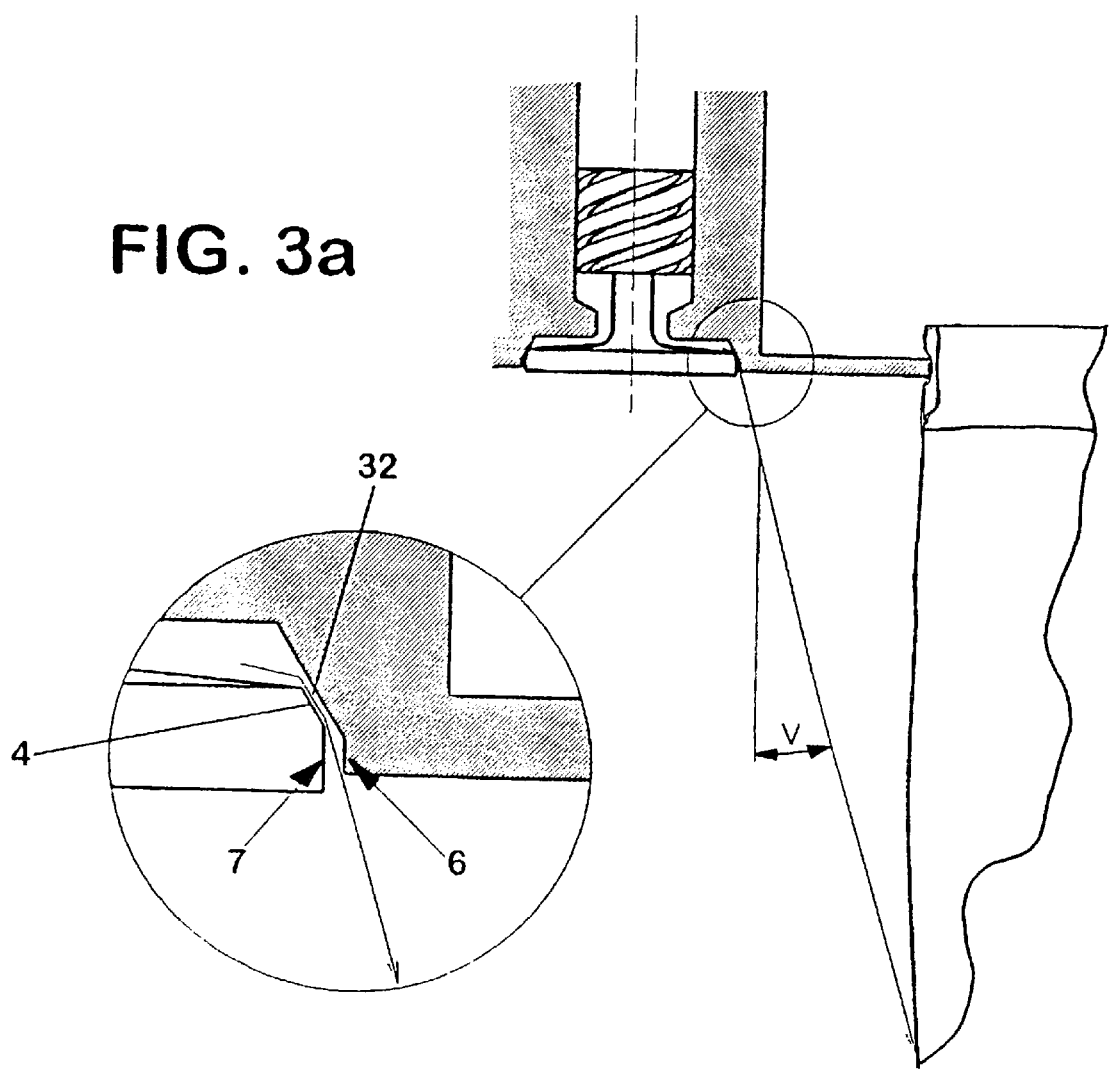
FIG. 3a shows the cleaning nozzle in FIG. 2 in a position near the first end position.

FIG. 3a shows a position of the valve body in which the cleaning fluid is passed through the passage 8 and through the channels 44 in the piston device 40 at a certain, relatively low pressure. The valve head 20 is defined by an annular conical part 4 and an annular cylindrical wall 7, and the valve seat is composed of a complementary conical part and a cylindrical wall 6. The channels 44 in the piston device 40 are shaped as helical depressions in the surface of the piston device 40 and are formed with a relatively small cross-sectional dimension, thereby producing a pressure loss in the cleaning fluid during the flow. This pressure loss may be observed as a reaction force with brings about a compression of the spring and a downwardly directed movement of the piston device 40, thereby causing the valve head 20 to be disengaged from the valve seat 32, and the cleaning fluid having been deflected by the upper side of the valve head 20, to flow out through the created peripheral gap with the shown orientation, i.e. with a primary direction defined by the angle v shown. This direction of flow is provided with the embodiment of the valve head and the valve seat shown on an enlarged scale in FIG. 3a, where the conically shaped valve seat 32 merges into a cylinder face 6. In this position of the valve body, the cleaning fluid jet hits the bag filter with a relatively great rate component in a downward direction and then runs down the sides of the filter.

Figure 3B:
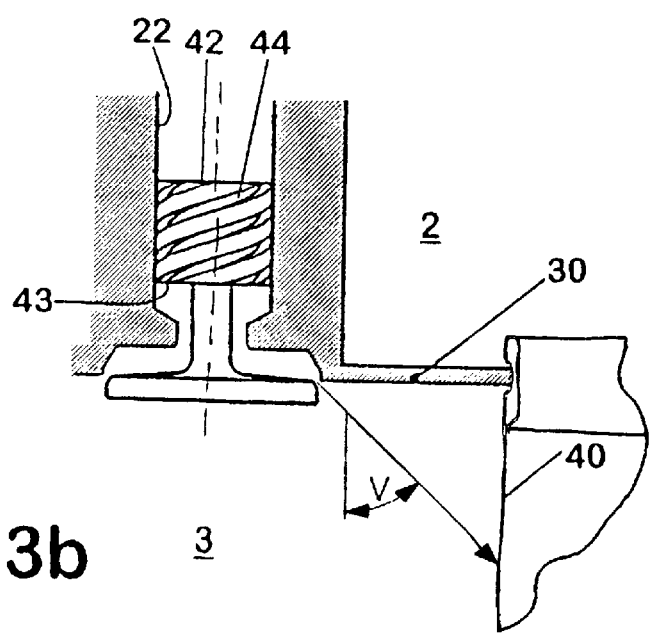
FIG. 3b shows the cleaning nozzle in FIG. 2 in a position slightly more remote from the first end position.

FIG. 3b shows the valve body 40 in a position in which the pressure of the cleaning fluid is slightly higher that the pressure used in FIG. 3a, and where the gap between the valve head 20 and the valve seat 32 is thereby slightly larger. In the figure, the reference numerals 3 and 2 indicate the first section and the second section, respectively, of the filter chamber, and the reference numeral 40 indicates the upper end of a bag filter. The reference numeral 42 indicates the first or upper face and 43 the second or lower face of the piston device 40. In the shown position of the valve body, the angle v is slightly greater, thereby allowing the upper end 40 of the bag filter to be cleaned.

Figure 4A:
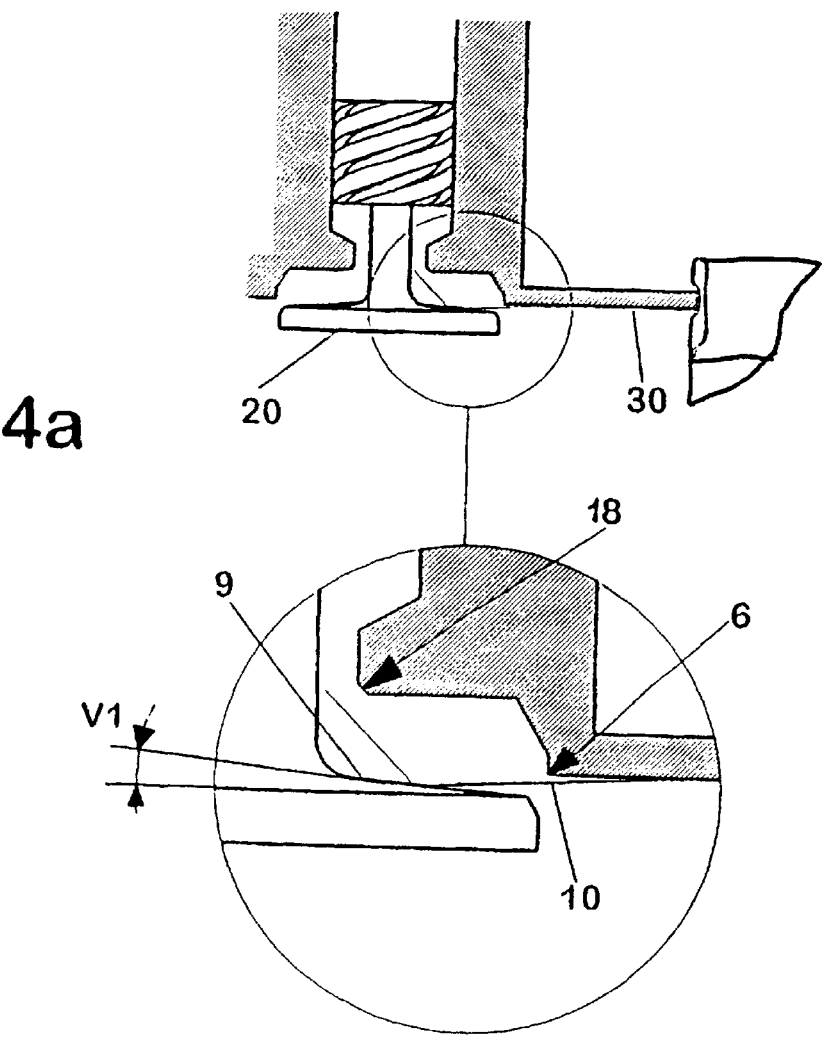
FIG. 4a shows the cleaning nozzle in FIG. 2 in a position near the second end position.
Figure 4B:
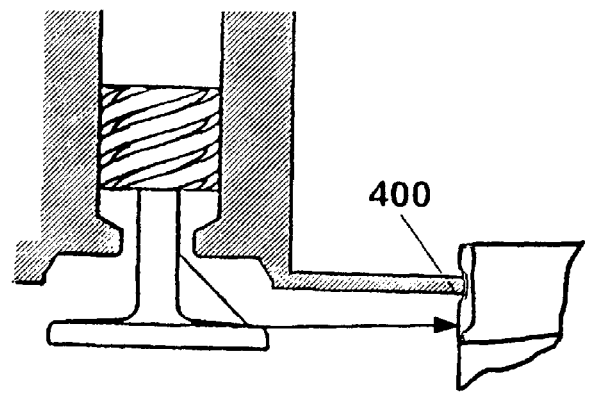
FIG. 4b shows the cleaning nozzle in FIG. 2 in the second end position.

In FIG. 4a, the valve head 20 is shown in a position moved further down relatively to FIG. 3b, where the flow of cleaning fluid now can pass freely through the gap between the upper side 9 of the valve head and the underside of the partition plate 30, without hitting the cylindrical wall 6. It appears that, in this position of the valve head, the cleaning fluid is reflected or deflected by the upper side 9, which has a conical shape with this end in view, and then hits the underside of the partition plate 30, so that also this part of the filter may be cleaned of deposited particles FIG. 4b shows the nozzle in its second end position in which cleaning of the nozzle itself may be provided, as all particles contained in the cleaning fluid can be flushed out freely in this position, thereby avoiding the clogging of the nozzle by particles mentioned with reference to FIG. 1.

Figure 5:
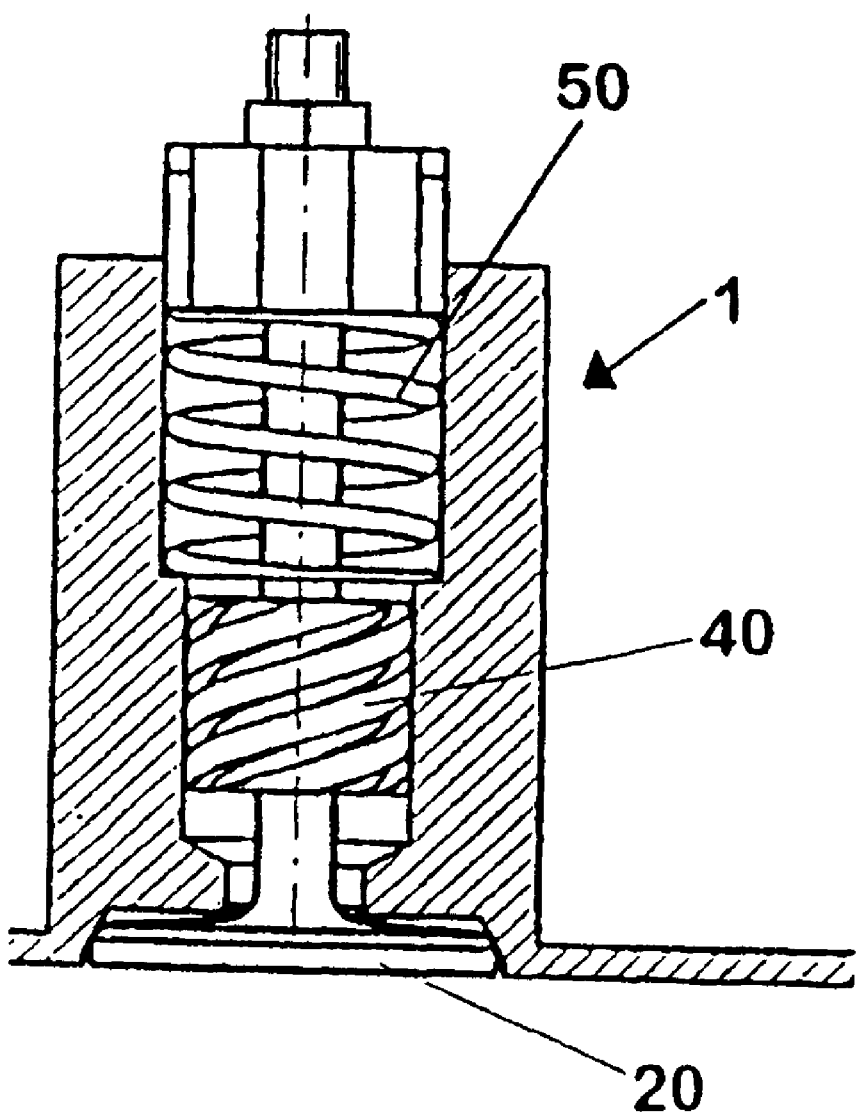
FIG. 5 shows the cleaning nozzle in FIG. 2 in the first end position and shown with the spring which tries to hold the valve body in the first end position.

FIG. 5 shows the nozzle of the filter in the closed position, there being also indicated a spring 50 above the piston device 40 which serves to keep the valve head in the closed position. As will appear, the nozzle is preferably shaped so that the lower face of the valve head 20, i.e. the face directed toward the "dirty" section 3 of the chamber, extends in the same plane as the underside of the partition 30 in the closed position.

What is claimed is:

1. A filter for filtering a particle-containing medium and of the type comprising a chamber having:
   a first section and a second section,
   a substantially horizontal extending partition plate which separates the two sections,
   said partition plate carrying a plurality of filter devices through which the medium to be filtered passes from the first section to the second section, and
   a plurality of nozzles connected with a source of a pressurized cleaning fluid and adapted to generate a flow of the cleaning fluid directed toward the partition plate and/or the filter devices,
   each of said nozzles comprising a housing having
      an inlet opening and an outlet opening for the cleaning fluid, said openings forming between them a passage defined by a wall,
      a valve body having a valve head and a valve rod,
      said valve rod being arranged to be moved in the interior of the passage between a first end position and a second end position,
      said outlet opening forming a valve seat adapted to cooperate with the valve head in the first position to prevent outflow of the cleaning fluid,
      means for generating a bias of the valve body in a direction toward the first end position,
      the valve body also comprises a piston device acting as a hydraulic piston, said piston device being arranged between the inlet opening and the outlet opening and adapted to generate a pressure loss in the cleaning fluid during its flow from the inlet opening and through the passage whereby the valve body is moved in a direction toward the second end position to allow outflow of the cleaning fluid through the outlet opening, a first face facing the inlet opening and a second face arranged so as to face the outlet opening, and a cylinder face adapted to be engaged with the wall of the passage in liquid-tight relationship, said piston device comprises at least one channel for the cleaning fluid, said channel extending from the first to the second face, and
      the valve head having an upper surface arranged for reflecting the cleaning liquid passing through at least one channel in the piston device to control the flow of the cleaning fluid toward the partition plate and/or the filter devices.

2. A filter according to claim 1, wherein the housing is formed as an integrated part of the partition plate.

3. A filter according to claim 1, wherein the piston device comprises a plurality of channels for the cleaning fluid, said channels extending from the first face to the second face.

4. A filter according to claim 3, wherein the channels are formed as depressions in the cylinder face.

5. A filter according to claim 4, wherein the channels are formed as helical depressions in the cylinder face.

6. A filter according to claim 5, wherein the passage is provided with a constricted portion in the area between the piston device and the outlet opening.

7. A filter according to claim 1, wherein the means for generating a bias of the valve body are formed by an elastic body.

8. A filter according to claim 7, wherein said elastic body is a coil spring.

9. A filter according to claim 1, wherein th valve seat is adapted such that, in the first position of the valve body, the surface of the valve head facing the first section is substatially in the same plane as the respective surface of the partition plate.

10. A filter according to claim 1, wherein the valve seat and the surface of the valve head facing the outlet opening has such a geometry that various outflow patterns of the cleaning fluid may be provided by movement of the valve body.

11. A filter according to claim 1, wherein the second end position, the valve body generates an outflow pattern where the cleaning fluid is ejected in a direction toward the partition plate by reflection against the surface of the valve head facing the outlet opening.

12. A filter according to claim 11, wherein the surface of the valve head facing the outlet has a conically tapering part with a cone angle v1, which is very small, and which is adapted to the desired outflow pattern.

13. A filter according to claim 1, wherein the valve seat and the surface of the valve head facing the outlet opening have cooperating conically tapering peripheral sections to provide reliable blocking of the cleaning fluid in the first end position.

14. A filter according to claim 1, wherein the filter devices are formed by depending bag filters, filter cartridges or envelope filters.

15. A filter for filtering a particle-containing medium comprising:
    means forming a chamber,
    a substantially horizontally-extending partition located within said chamber which subdivides said chamber into a first upper chamber and a second lower chamber, said partition mounting a plurality of filter devices and including a plurality of passageways therethrough, each of said plurality of passageways having an upper inlet opening for cleaning fluid and a lower outlet opening for cleaning fluid, each said outlet opening providing a seat for a valve head,
    means for delivering cleaning fluid to the inlet openings of said plurality passageways,
    a movable cylindrical piston sealingly positioned in each passageway and defining a channel through which cleaning fluid entering said inlet opening can flow to said outlet opening,
    a valve body connected to said cylindrical piston in each passageway, each valve body including a valve rod and a valve head, each said valve head being movable between a first position in contact with a respective valve seat to block flow of cleaning fluid out a respective outlet opening and a second position spaced away from the respective valve seat, each said valve head being movable from said first position to said second position by movement of the respective piston due to pressure of cleaning fluid thereon, and cleaning fluid which has passed through the channel in the respective piston toward the valve head when in said second position being reflected by an upper surface of said valve head towards at least one of said partition plate and said filter devices, and
    spring means for biasing each said valve head into a first position thereof.

* * * * *